(12) United States Patent
Basso et al.

(10) Patent No.: US 8,619,782 B2
(45) Date of Patent: Dec. 31, 2013

(54) BIDIRECTIONAL PACKET FLOW TRANSFORMATION

(75) Inventors: Claude Basso, Research Triangle Park, NC (US); Jean L Calvignac, Raleigh, NC (US); Natarajan Vaidhyanathan, Research Triangle Park, NC (US); Fabrice Verplanken, LaGaude (FR)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 13/325,624

(22) Filed: Dec. 14, 2011

(65) Prior Publication Data

US 2012/0155494 A1 Jun. 21, 2012

(30) Foreign Application Priority Data

Dec. 14, 2010 (EP) .................................... 10306403

(51) Int. Cl.
*H04L 12/28* (2006.01)
*H04L 12/56* (2011.01)
*G06F 7/00* (2006.01)
*G06F 17/00* (2006.01)

(52) U.S. Cl.
USPC ............ 370/392; 370/389; 707/698; 707/747

(58) Field of Classification Search
USPC ............. 370/389, 392, 395.21; 707/698, 747, 707/216
See application file for complete search history.

(56) References Cited

U.S. PATENT DOCUMENTS

| | | | |
|---|---|---|---|
| 6,954,789 B2 | 10/2005 | Dietz et al. | |
| 7,669,234 B2 | 2/2010 | Buer | |
| 2003/0108055 A1* | 6/2003 | Damon et al. ................ | 370/401 |
| 2005/0238010 A1* | 10/2005 | Panigrahy et al. ............ | 370/389 |
| 2007/0280198 A1* | 12/2007 | Davis ............................ | 370/351 |
| 2009/0323692 A1* | 12/2009 | Li et al. ......................... | 370/392 |
| 2010/0040067 A1 | 2/2010 | Hao et al. | |
| 2012/0136999 A1* | 5/2012 | Roitshtein et al. ............ | 709/225 |
| 2012/0155494 A1* | 6/2012 | Basso et al. ................... | 370/474 |

OTHER PUBLICATIONS

Kang Li et al.,"Architectures for Packet Classification Caching", ICON 2003,The 11th IEEE International Conference on Networks (IEEE Cat. No. 03EX671), 111-17, 2003.

* cited by examiner

*Primary Examiner* — Benjamin H Elliott, IV
(74) *Attorney, Agent, or Firm* — Yudell Isidore Ng Russell PLLC

(57) ABSTRACT

A network packet includes a packet key that includes one or more source-destination field pairs that each include a source field and a destination field. For each selected source-destination field pair, first and second sections are selected in the packet key. A source field value is extracted from the source field and a destination field value is extracted from the destination field. For each source bit of the source field value: a destination bit is selected from the destination field; an OR logic function is applied to the source bit and the destination bit to generate a first resulting value is stored at the same bit position as the source bit in the first section; an AND logic function is applied to the source bit and the destination bit to generate a second resulting value stored at the same bit position as the source bit in the second section.

11 Claims, 5 Drawing Sheets

300

| SA (301) | Source Address | 4 Bytes |
| SP (302) | Source Port | 2 Bytes |
| DA (303) | Destination Address | 4 Bytes |
| DP 304) | Destination Port | 2 Bytes |
| Proto (305) | Protocol | 1 Byte |

400

US 8,619,782 B2

BIDIRECTIONAL PACKET FLOW TRANSFORMATION

CROSS-REFERENCE TO RELATED APPLICATIONS

The present application is related to the following commonly assigned patent applications: U.S. patent application Ser. No. 13/325,553, entitled "COMPACTED BINARY IDENTIFIER GENERATION" by Claude Basso et al.; and U.S. patent application Ser. No. 13/325,597, entitled "ANALYSIS OF NETWORK PACKETS USING A GENERATED HASH CODE" by Claude Basso et al., all of which were filed on even data herewith and are incorporated herein by reference in their entirety for all purposes.

This application claims priority to European Patent Application No. EP10306403, entitled "BISECTIONAL PACKET FLOW TRANSFORMATION," filed Dec. 14, 2010, the disclosure of which is hereby incorporated herein by reference in its entirety.

BACKGROUND

1. Field

This disclosure relates generally to packet flow and, more specifically, to bidirectional packet flow transformation.

2. Related Art

As network processors become more pervasive, technology is constantly developing to provide more flexibility and improved capabilities with respect to network packet processing features. Network processors process and route packets formatted according to a given protocol (e.g., transmission control protocol (TCP)), based on computations performed on packet fields. A traditional limitation related to packet processing in network processors is packet flow bi-directionality. In general, existing network processors do not allow optimal identification of functional packet flows for packets exchanged in either direction on a connection.

For example, a TCP connection is essentially bidirectional since it is set-up as a reliable communication channel between two hosts (i.e., a "source" host initiating the TCP connection that triggers the connection set-up process with an exchange of specific "sync" packets with a "destination" host that participates in the connection set-up process by responding to the source host in a return IP path). Once the TCP connection is established, the connection runs under a flow control scheme that involves the exchange between the hosts of the position inside the byte stream (windowing) and congestion information ("ack"). In sum, TCP exchange relies on symmetrical exchange of control information between two hosts.

In general, some network processor applications are involved in the management of only one side of a network connection, while other network processor applications are involved in the management of both sides of the network connection. For example, an "end-point" application is typically involved in the termination of a TCP connection, as an end-point application runs on only one of two hosts communicating over the TCP connection. A major hardware off-load process in end-point applications is to classify incoming packets so that a receive queue is selected to receive all packets belonging to one or several TCP connections. As another example, a "network node" application is typically involved in the interception of a TCP connection, as a network node application runs in an intermediate point in the network to support the TCP connection between two hosts.

A common way to operate applications monitoring network connections is to expose them to the aggregation of all traffic received in a network node. That is, all packets received from all ports of a network processor are forwarded to the applications controlling the network node. This implies that a network node application receives packets from both sides of a TCP connection, although each side is usually on a different port. Existing solutions do not allow a classification of incoming packets by network connection independent of which port has received the packet, i.e., a same classification usually cannot be performed for packets related to the two sides of a same network connection. Accordingly, packets of both sides of the network connection cannot be easily managed to be received in a same receive queue and/or sent for final processing to a same processing core or thread.

SUMMARY

According to one aspect of the present disclosure, a technique for processing a network packet includes receiving the network packet. The network packet includes a packet key that includes one or more source-destination field pairs. Each source-destination field pair that is included in the one or more source-destination field pairs includes a source field and a destination field. For each selected source-destination field pair included in the one or more source-destination field pairs a first section and a second section are selected in the packet key. A source field value is extracted from the source field and a destination field value is extracted from the destination field of the selected source-destination field pair. For each source bit of the source field value: a destination bit located at a same bit position as the source bit is selected from the destination field; an OR logic function is applied to the source bit and the destination bit to generate a first resulting value; the first resulting value is stored at the same bit position as the source bit in the first section; an AND logic function is applied to the source bit and the destination bit to generate a second resulting value; and the second resulting value is stored at the same bit position as the source bit in the second section.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

As will be appreciated by one of ordinary skill in the art, the present invention may be embodied as a method, system, device, or computer program product. Accordingly, the present invention may take the form of an embodiment including hardware, an embodiment including software (including firmware, resident software, microcode, etc.) or an embodiment combining software and hardware aspects that may all generally be referred to herein as a circuit, module, or system. The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein the term "coupled" includes a direct electrical connection between elements or blocks and an indirect electrical connection between elements or blocks achieved using one or more intervening elements or blocks.

According to the present disclosure, generation of identical resulting keys (in which some or all pairs of fields are made bitwise symmetric) is employed such that swapping of bits in the fields of input keys leads to the same resulting output keys. In this manner, bidirectional flows are associated when destination and source field pairs (e.g., address or port fields) are interchanged.

Embodiments of the present disclosure provide a packet transformation device for selectively transforming source-destination field pairs of a bidirectional packet flow so that a same flow identifier is generated for both packet flow directions. Each source-destination field pair relates to a network parameter. This includes, for example, the source-destination address pair for an address parameter (e.g., Internet protocol (IP) addresses) and the source-destination port pair for a port parameter (e.g., transmission control protocol (TCP) ports).

Figure 1:
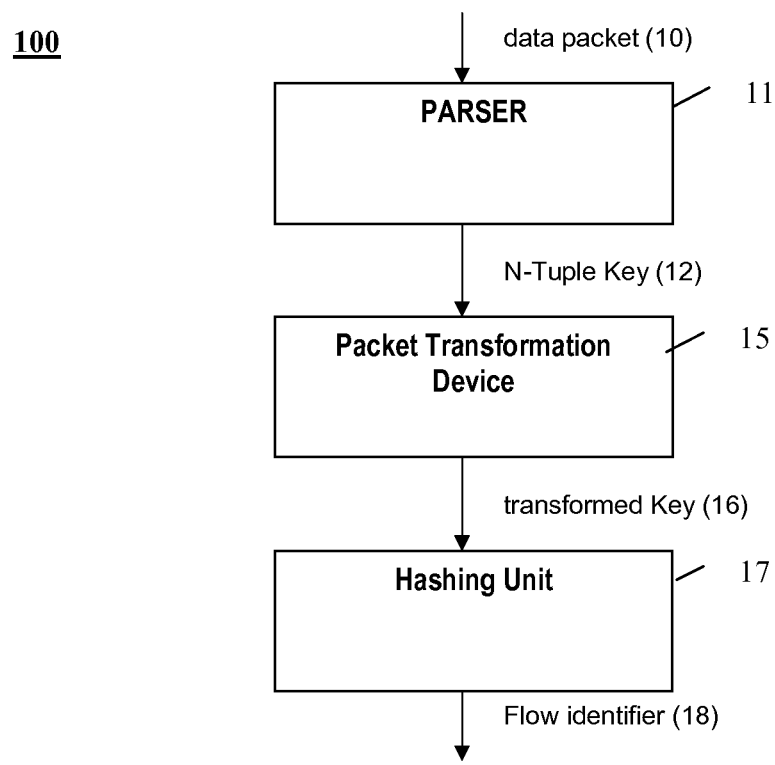
FIG. 1 is a diagram of a relevant portion an exemplary network architecture for a network processor that implements a hasher configured according to the present disclosure.

FIG. 1 shows an exemplary hasher 100 that includes a packet parser 11, a packet transformation device 15, and a hashing unit 17 that are configured according to aspects of the present disclosure. Hasher 100 may, for example, be implemented within a network processor. Hasher 100 produces a value (referred to as a hashing value or a flow identifier) that permits identification of a packet to a degree of granularity. It should be appreciated that packet transformation device 15 may be employed in other network processor components to transform a data packet into a symmetric packet. It should also be appreciated that the term 'symmetric' as used herein refers to a transformed packet that provides the same values for at least one source-destination pair for both packet flow directions (i.e., from source-to-destination and from destination-to-source). The term 'packet' as used herein encompasses data exchanged in a variety of networks and includes a header and payload featured according to a suitable communication protocol (e.g., TCP/IP, UDP, etc.). Hashser 100 is generally more flexible than conventional hashers used in conventional network processors.

Flexibility of hash functions implemented by a hasher may depend on the way in which a hash key (hasher input) is assembled, or the properties of the hash function. Conventionally, flexibility in key assembly has been achieved in software implementations of hashers, while flexible hash functions have usually involved some form of configurable hardware hasher implementation. In general, software key assemblies have performance limitations when complex patterns are required to build the hash key (in particular, when the key assembly is done at bit-level granularity). Additionally, configurable hardware hash functions usually have silicon area limitations due to the configuration logic implementing the base hashing elements (typically implemented with exclusive OR (XOR) gates). Typically, the limitations are more severe when a hasher is used to identify packet flows on very high-speed interfaces (e.g., 10 Gbps or more), mainly due to very short packet periodicity (e.g., 67.2 ns or less).

Existing hashers do not allow optimal identification of functional packet flows for packets exchanged in either direction on a link. For such hasher applications, it is desirable for a hasher to generate a same hashed value from the two forms of keys corresponding to the two sides of a connection. According to the present disclosure, packet transformation device 15 is configured to facilitate identification of both flows of a same bidirectional packet with a same flow identifier. Packet transformation device 15 may be manually configurable to operate on a set of connection-related fields (address, port). Alternatively, packet transformation device 15 may be automatically configured based on predefined conditions. For example, in an application where a parser may need to handle user datagram protocol (UDP) packets in a symmetrical way and TCP packets in a regular way, the predefined conditions may include previously determining if the layer protocol is UDP or TCP protocol. In this manner, pair transformation is facilitated for a packet subject to protocol recognition (e.g., facilitated via a protocol field).

In general, packet transformation device 15 relies on bitwise processing of values maintained in source and destination positions of a same field in a packet key. Hasher 100 includes a parser 11 for extracting bytes from headers (and/or payloads of received data packets 10) and transmitting resulting packet data (referred to hereafter as a packet key) 12 to packet transformation device 15. Packet transformation device 15 selectively transforms packet key 12 into a transformed packet key 16 having one or more symmetrical source-destination field pairs. The symmetric or transformed packet key 16 is then provided to hashing unit 17, which produces a flow identifier (hash value) 18 from the transformed packet key 16 that permits identification of a packet to a degree of granularity and the assignment of the packet to a particular receive or transmit queue according to predefined rules (e.g., like packets are assigned to a same queue).

In particular, hashing unit 17 generates a same flow identifier 18 for data packets corresponding to two directions of a same connection. Flow identifier 18 may be used to access data structures though a hash table and retrieve information for the processing of the packet to determine which interfaces should receive a packet corresponding to a particular flow. In general, packet identifiers are computed for each packet processed by a network processor.

Figure 2:
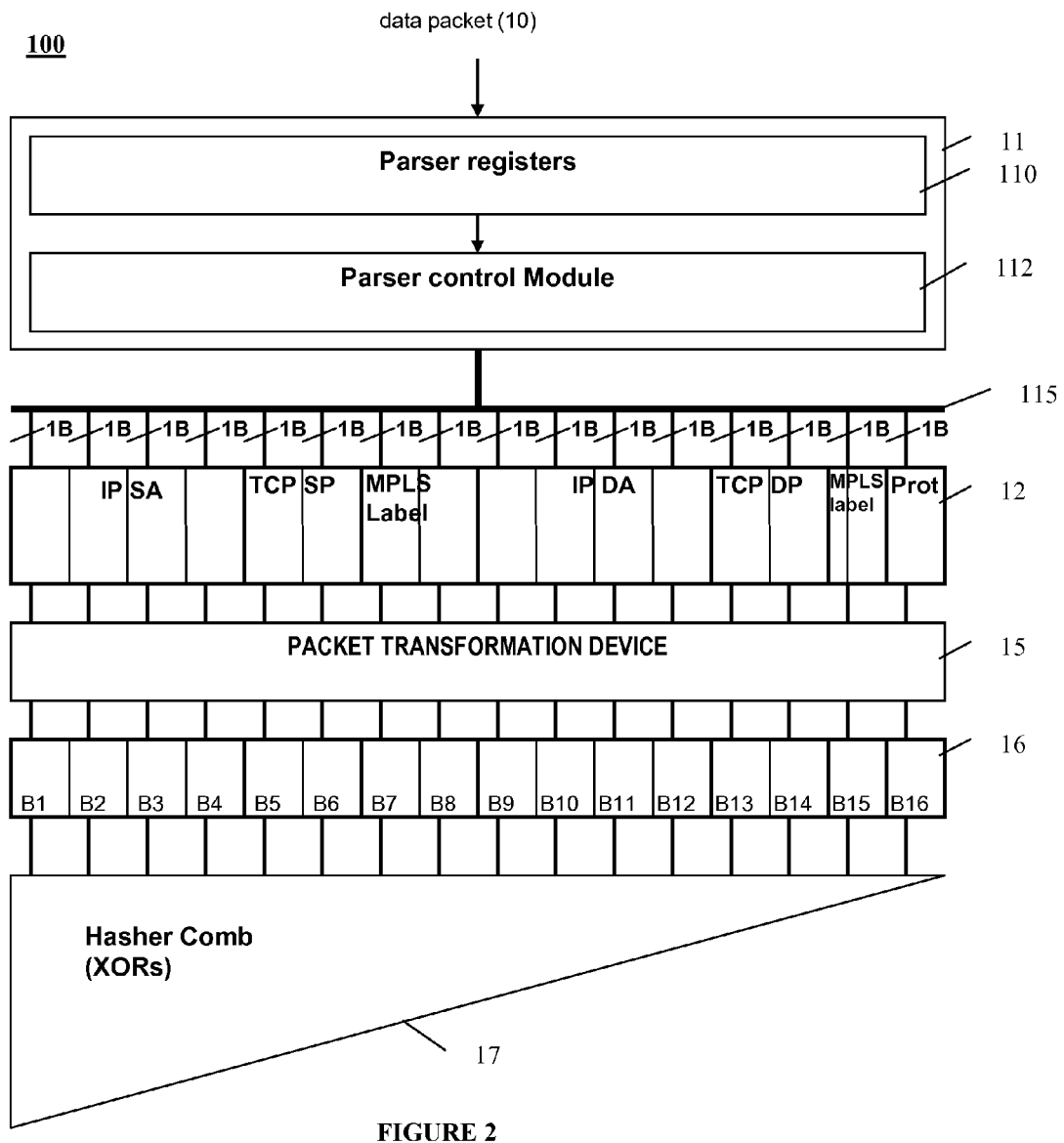
FIG. 2 is a diagram of a relevant portion of an exemplary hasher employed in the network architecture of FIG. 1.

FIG. 2 illustrates a detailed view of the hasher 100 represented in FIG. 1. As shown, parser 11 includes one or more parser registers 110 (e.g., 16-byte registers for a TCP connection) that are individually addressable, in order to be loaded by parser 11 according to a predefined order. The order in which the various bytes are loaded may be determined by the amount of information included in each extracted byte that can contribute to flow identification. Parser 11 includes a parser control module 112 for extracting information from register 110 and providing the information to packet transformation device 15. Parser control module 112 may map the information extracted from the packet onto a standard input structure, referred to herein as a 'packet key'. Hasher 100 includes a distribution bus 115 to provide the packet flow input to packet transformation device 15.

Distribution bus 115 is configured to fill any input of packet transformation device 15 bytewise from packet parser 11. In this manner, packet transformation device 15 can similarly process a packet corresponding to a same connection independent of packet flow direction. In general, a connection includes two flows, one in each direction between two nodes of the network. Typically, a packet flow includes a number of connection related fields (which have a source value and a destination value) on top of other fields. In various embodiments, several fields may be extracted from a packet in order to build an input key for hashing unit 17.

In one or more embodiments, hashing unit 17 (also referred to herein as a hasher cone or a hasher combinatorial cone) provides a combinatorial cone of logic based on exclusive OR (XOR) gates that combine all bits of a 128-bit hash key and produce a resulting 32-bit hash value. Hashing unit 17 generally includes configuration logic that implements the base hashing elements (typically implemented with a combination of XOR gates). An output of hashing unit 17 may be used for identifying packet flows on very high-speed interfaces (10 Gbps or more), when packet periodicity is short (67.2 ns or less). It should be appreciated that different patterns may be used to build a hash key (e.g., when key assembly is done at bit-level granularity and configurable hardware hash functions have silicon area limitations).

Figures 3, 4:
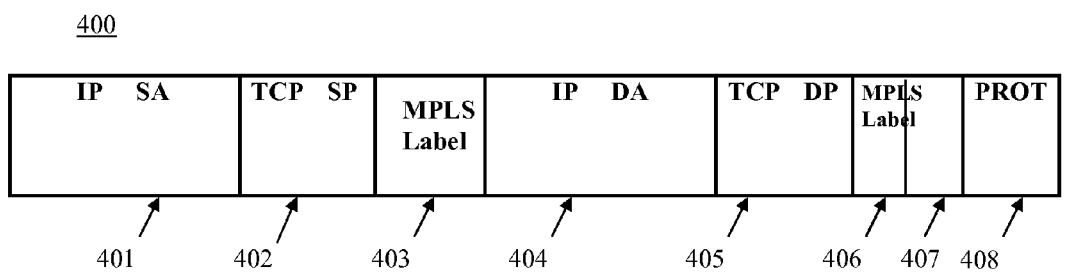
FIG. 3 is a diagram of an exemplary packet 5-tuple.
FIG. 4 is a diagram of an exemplary packet key forming a 5-tuple according to a transmission control protocol/Internet protocol (TCP/IP)

FIG. 3 illustrates an exemplary 5-Tuple key 300 that includes information extracted from a data packet flowing from a source node to a destination node over a network. In general, packet flow is defined by a source address (SA) 301, a destination address (DA) 303, a source port (SP) 302, a destination port (DP) 304, and a protocol (Proto) 305. It should be appreciated that a source and destination value of a same field (e.g., address or port) are reversed for packet flows corresponding to opposite directions. In general, an address parameter may be formatted according to any communication protocol, e.g., Internet protocol version 4 (IPv4), Internet protocol version 6 (IPv6), media access control (MAC), transmission control protocol (TCP), user datagram protocol (UDP), etc. For example, in a TCP connection or a UDP connection, a 5-Tuple packet flow 300 includes: a source address 301 (e.g., with four bytes in an IPv4 header and sixteen bytes in an IPv6 header); a destination address 303 (e.g., with four bytes in an IPv4 header and sixteen bytes in an IPv6 header); a protocol field 305 (e.g., with one byte for an IP header and a value of '6' for a TCP connection and a value of '17' for a UDP connection); a source port 302 (e.g., with two bytes for a TCP or UDP header); and a TCP/UDP destination port 304 (e.g., with two bytes for a TCP or UDP header).

FIG. 4 shows another exemplary key that may form a standard hasher input data structure 400 for a network processor. As shown in FIG. 4, the standard hasher input structure 400 includes sixteen bytes. A first section 401 includes four bytes that are used for IP source addresses (IP SA). A second section 402 includes two bytes that are used for TCP source port (TCP SP) values. A third section 403 includes two bytes that are used for multi-protocol label switching (MPLS) values. A fourth section 404 includes four bytes that are used for IP destination addresses (IP DA). A fifth section 405 includes two bytes that are used for TCP destination port (TCP DP) values. A sixth section 406 includes four bits that are used for MPLS values in continuation with third section 403. A seventh section 407 includes four bits that are reserved. Finally, an eighth section 408 includes one byte that is used for protocol (Prot) values.

Similar to 5-Tuple key 300 of FIG. 3, data structure 400 of FIG. 4 includes two source-destination field pairs, i.e., a first source-destination field pair for the address parameter and a second source-destination field pair for the port parameter. According to the present disclosure, a transformation is performed on preselected source-destination field pairs associated with respective parameters. An exemplary source-destination field pair in an IP connection is the address pair comprising an IP source address (IP SA) and an IP destination address (IP DA). In a TCP connection, an exemplary source-destination field pair is the port pair that includes the source port (TCP SP) and the destination port (TCP DP).

According to the present disclosure, the source and destination values of the source-destination field pairs are swapped in the headers of the packets received on the two sides of the connection. For example, a TCP connection between two hosts A and B will carry packets with the following 5-tuples: two source-destination field pair including {Ia, Ib} for the first flow direction and {Ib, Ia} for the other flow direction; {Ta,Tb} for the first flow direction and {Tb, Ta} for the other flow direction. That is, a first flow from host A to host B includes Ia Ib P Ta Tb and a second flow from host B to host A includes Ib Ia P Tb Ta. According to the present disclosure, the transformation of a packet key is achieved by reordering the bits of the source and destination values of a given pair. That is, each bit of the source field of the pair is replaced with the largest bit among the source bit and the corresponding destination bit in the destination field (i.e., the bits are ORed) and each bit of the destination field of the pair is replaced with the lowest bit among the source bit and the corresponding destination bit in the destination field of the pair (i.e., the bits are ANDed). Alternatively, the largest bit may be stored to the destination field and the lowest bit may be stored to the source field at the same bit position.

Figure 5:
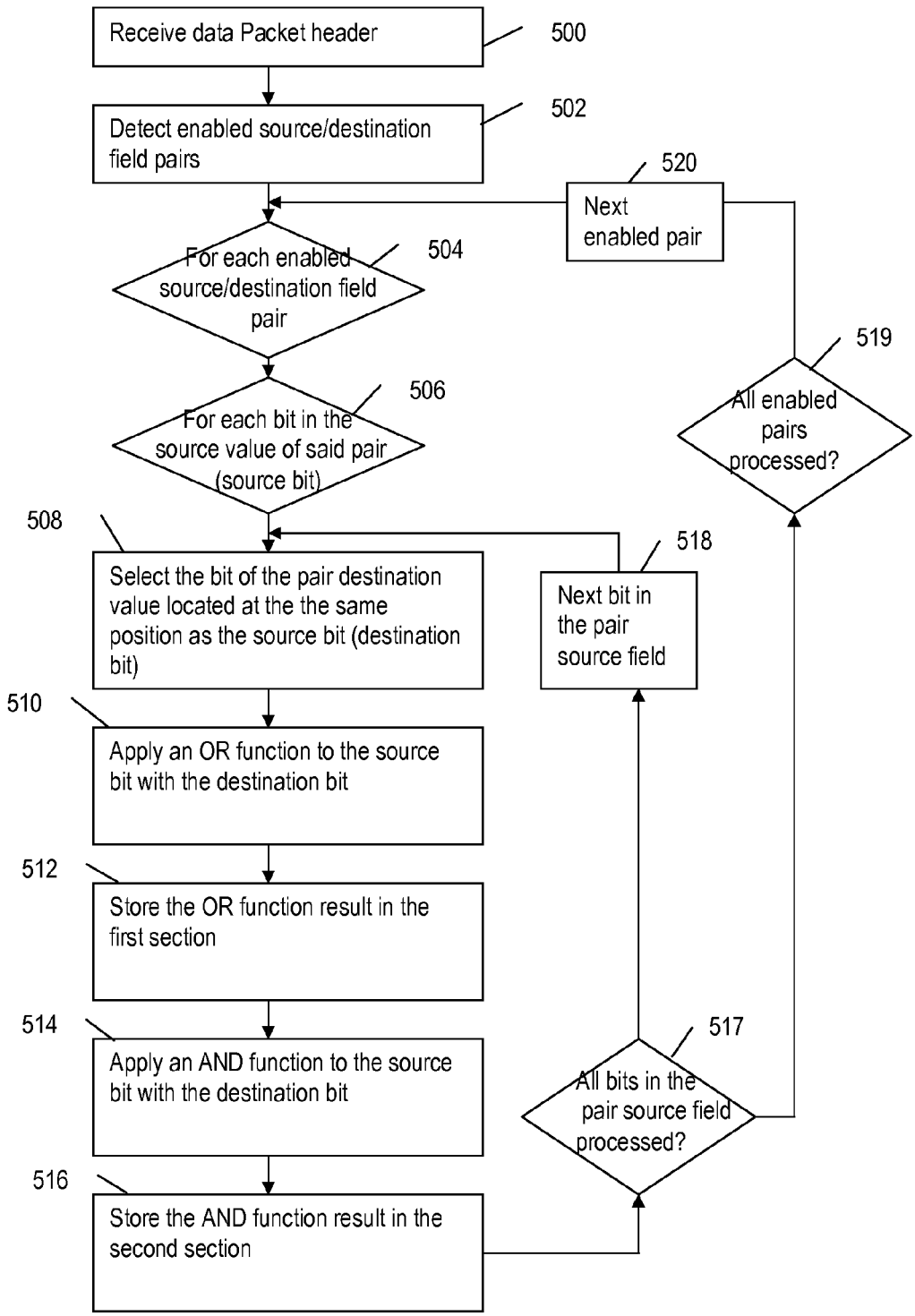
FIG. 5 is a flowchart of an exemplary process for selectively transforming a data packet according to the present disclosure.

FIG. 5 shows a flowchart for performing a symmetric transformation process of one or more preselected source-destination pairs of a same field according to one or more embodiments of the present disclosure. The process is initiated at block 500 when an input packet key 12 is received by packet transformation device 15. Packet key 12 includes source-destination field pairs related to respective parameters such as, in the exemplary data structure of FIGS. 3 and 4, the pair {source address, destination address} for the address fields, or the pair {source port, destination port} for the port fields, as well as additional fields (e.g., a protocol field (Prot)) depending on the protocol. In block 502, packet transformation device 15 determines which of the source-destination field pairs have an enabled state. An enabled state may be manually activated by a user or automatically activated based on predefined conditions to identify the pairs that are to be transformed by packet transformation device 15.

In block 504, for each enabled source-destination field pair, packet transformation device 15 retrieves the source field value (e.g., the 4-byte source address) and the destination field value (e.g. the 4-byte destination address). Next, in block 506, packet transformation device 15 iterates blocks 508 to 516 for each bit of the pair source field. In block 508, for the current bit 'ai' of the source field value (referred to hereafter as the 'source bit'), the bit 'bi' corresponding to the same position in the destination field value (referred to hereafter as the 'destination bit') is selected. In block 510, packet transformation device 15 applies an OR logical function between the source bit 'ai' and the corresponding destination bit 'bi' to provide a first resulting bit value 'cij'. In block 512, the original bit 'ai' of the pair source field is replaced with the first resulting bit value 'cij'.

In block 514, packet transformation device 15 applies an AND logical function between the source bit 'ai' and the corresponding destination bit 'bi' to provide a second resulting value 'dij'. In block 516, the original bit 'bi' of the pair destination field is replaced with the second resulting bit value 'dij'. Alternatively, resulting bit 'cij' obtained in block 510 (OR function) may be stored in the destination field (at the same bit position) and the resulting bit 'dij' obtained in block 514 (AND function) may be stored in the source field (at the same bit position).

In block 518, the next bit in the source field of the current pair is selected if all of the bits (e.g. 32-bits) have not been processed in block 517, and blocks 508 to 514 are repeated. If packet transformation device 15 determines in block 517 that all the bits of the current pair have been processed, control transfers to block 519. In block 519, in response to not all of the field pairs being processed, control transfers to block 520 where packet transformation device 15 selects the next enabled source-destination field pair that is to be processed. From block 520 control transfers to block 504 and then to block 506. Accordingly, for each enabled field pair, the source bit is replaced with the largest bit among the source bit and the destination bit and the destination bit is replaced with the lowest bit among the source bit and the destination bit.

In this manner, packet transformation device 15 facilitates identification of packets relating to a same connection (flow from source-to-destination and from destination-to-source). The transformation performed by packet transformation device 15 enables hasher 100 to equally identify bidirectional flows when destination and source values of a same connection related field in a same packet flow are interchanged. As a result, a same hashed value can be generated by the hashing function employed in hashing unit 17 when an input key is assembled with source and destination fields swapped. For example, for flows exchanged between systems at IP addresses A and B, the same hashed value can be generated when the input key contains DA=A and SA=B and when the input key contains DA=B and SA=A. This also applies to TCP/UDP source and destination ports, or to other source-destination field pairs.

For example, bitwise operations may be performed according to the table below, where 'ai' is the current bit of the source field (e.g., SA or SP), 'bi' is the corresponding bit of the destination field (e.g., DA or DP), 'cij' is the resulting reordered bit ('ai' OR 'bi') of the first reordered value and 'dij' is the resulting reordered bit of the second reordered value ('ai' AND 'bi').

| ai | bi | cij (=ai OR bi) | dij (=ai AND bi) |
|---|---|---|---|
| 0 | 0 | 0 | 0 |
| 1 | 0 | 1 | 0 |
| 0 | 1 | 1 | 0 |
| 1 | 1 | 1 | 1 |

In general, solutions according to the present disclosure improve a hardware implementation of a hasher for TCP connections and minimizes the silicon area required for the hasher, without requiring complex bit subtractors (e.g., 32-bit and 16-bit subtractors) to perform comparisons of source-destination field pairs (e.g. 4-byte IP addresses, 2-byte TCP ports).

Figure 6:
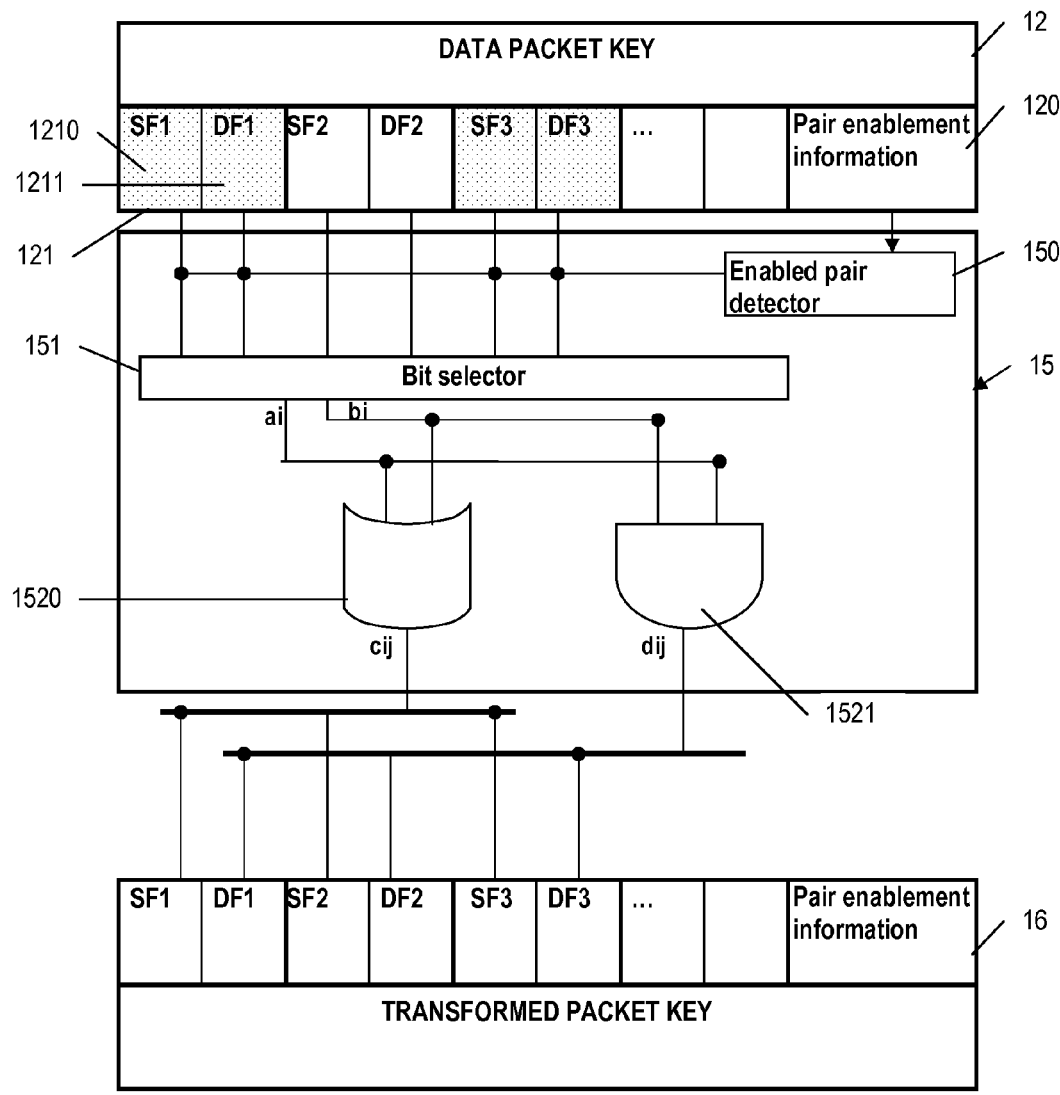
FIG. 6 is a diagram of a relevant portion of an exemplary packet transformation device configured according to the present disclosure.

FIG. 6 shows an exemplary structure for packet transformation device 15 according to one or more certain embodiments of the present disclosure. Packet transformation device 15 receives a packet key 12 that includes data extracted from a data packet transmitted from a source node to a destination node according to a given protocol. Packet key 12 includes a number of source-destination field pairs 121, e.g., {SF1, DF1}, {SF2, DF2}, {SF3, DF3}, where SFj designates source field 1210 and DFj designates destination field 1211 of pair j. Packet key 12 also comprises pair enablement information 120 to facilitate identification of the enabled pair. For illustrative purpose, the enabled pair {SF1, DF1} and {SF3, DF3} are represented with dotted backgrounds. Packet transformation device 15 may also include additional information depending on the communication protocol. Pair enablement information 120 may include a number of control bits associated with a given field pair or alternatively a number of control bits associated with respective bytes of a packet.

It should be understood that the arrangement of the different fields of a packet key (including the pair enablement information bits) are for illustrative purposes. Packet transformation device 15 includes an enabled pair detector 150 which is provided to indicate whether the field pairs are in an enabled state. Packet transformation device 15 also includes a bit selector 151 (to select the corresponding bits of the source field and the destination field of each detected pair), an OR gate 1520 (for applying the OR function to each bit 'ai' of the source field of an enabled pair and the corresponding bit 'bi' of the destination field of the pair and providing the first resulting value 'cij'). Packet transformation device 15 also includes an AND gate 1521 (for applying the AND function to each bit 'ai' of the source field of an enabled pair with the corresponding bit 'bi' of the destination field of the pair and providing the second resulting value 'dij').

In some situations, the transformation may not be deterministic. However, whether the transformation is non-deterministic is irrelevant as the hasher is non-deterministic by nature. According to various embodiments, field pairs may be manually or automatically configured so that only the enabled pairs are selected for the transformation. Accordingly packet transformation may be adapted to the type of application in which the hasher is used. For example, in mixed-mode environments, i.e., applications with variable symmetry requirements, the configuration may be defined per port. In order to preserve the flexibility offered to the parser for assembling the hash keys, the enablement of the symmetry transformation may not be done per field pair, but instead per pair of bytes.

In one exemplary embodiment (see the data structure of FIG. 3), each input register 110 where parser 11 assembles the hash key is 16-bytes long (byte 0 to byte 15), structured as eight pairs of 1-byte registers (bytes 0-8, bytes 1-9, etc). A configuration register that may be used per port holds an 8-bit value (bit 0 to bit 7) to enable symmetry transformation of each of the eight pairs of bytes of the input register (e.g., bit 0 enables symmetry for bytes 0-8; bit 1 enables symmetry for bytes 1-9; bit 7 enables symmetry for bytes 7-15, etc.). Alternatively, instead of using enablement information 120 comprising one control bit per byte pair (i.e., eight control bits for the data structure of FIG. 4), enablement information 120 may comprise one control bit per bit pair (i.e., 32-bits for the data structure of FIG. 4).

In general, the disclosed embodiments provide an efficient solution that allows processing of two flows of a same packet while optimizing hardware area. In hasher applications, the disclosed transformation usually speeds up a look-up process in a hash table associated with the hasher. Accordingly, a network processor has been described herein that readily facilitates identification of packets related to a same connection in a bidirectional manner.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A hasher, comprising:
  a packet parser configured to receive a network packet, wherein the network packet includes a packet key that includes one or more source-destination field pairs, and wherein each source-destination field pair that is included in the one or more source-destination field pairs includes a source field and a destination field;
  a packet transformation device coupled to the packet parser, wherein the packet transformation device is configured to:
    for each selected source-destination field pair included in the one or more source-destination field pairs:
      select a first section and a second section in the packet key; and
      extract a source field value from the source field and a destination field value from the destination field of the selected source-destination field pair; and
    for each source bit of the source field value:
      select, from the destination field value, a destination bit located at a same bit position as the source bit;
      apply an OR logic function to the source bit and the destination bit to generate a first resulting value;
      store the first resulting value at the same bit position as the source bit in the first section;
      apply an AND logic function to the source bit and the destination bit to generate a second resulting value; and
      store the second resulting value at the same bit position as the source bit in the second section.

2. The hasher of claim 1, wherein the first section corresponds to a source field section of the selected source-destination field pair and the second section corresponds to a destination field section of the selected source-destination field pair.

3. The hasher of claim 1, wherein the first section corresponds to a destination field section of the selected source-destination field pair and the second section corresponds to a source field section of the selected source-destination field pair.

4. The hasher of claim 1, wherein the packet key further includes pair enablement information and the selected source-destination field pair is determined from the pair enablement information.

5. The hasher of claim 4, wherein the pair enablement information includes a control bit for each of the source-destination field pairs, and wherein the hasher is further configured to select the selected source-destination field pair in response to a value of the control bit associated with selected source-destination field pair matching a predefined value.

6. The hasher of claim 4, wherein the pair enablement information includes control bits associated with respective sets of bytes in the packet key, and wherein the hasher is further configured to select the selected source-destination field pair in response to values of the control bits associated with the bytes of the selected source-destination field pair matching a predefined value.

7. The hasher of claim 6, wherein the packet key is provided from a set of registers adapted to extract data from the network packet and each register of the set of registers has a predefined byte size and is arranged to feed a predefined section of the packet key, and wherein a control bit is received from each register in association with the bytes provided by the register to the network packet.

8. The hasher of claim 4, wherein the pair enablement information includes control bits associated with respective pair of bits in the packet key, and wherein the hasher is further configured to select the selected source-destination field pair when bit control values associated with the bits of the selected source-destination field pair match a predefined value.

9. The hasher of claim 4, wherein the pair enablement information is manually configurable.

10. The hasher of claim 4, wherein the pair enablement information is automatically configurable based on predefined conditions.

11. A hasher, comprising:

a packet parser configured to receive a network packet, wherein the network packet includes a packet key that includes one or more source-destination field pairs, and wherein each source-destination field pair that is included in the one or more source-destination field pairs includes a source field and a destination field, where the packet parser includes a set of registers for storing the packet key and the packet key further includes pair enablement information;

a packet transformation device coupled to the packet parser, wherein the packet transformation device is configured to:

- select a source-destination field pair based on the pair enablement information and for each selected source-destination field pair included in the one or more source-destination field pairs:
  - select a first section and a second section in the packet key; and
  - extract a source field value from the source field and a destination field value from the destination field of the selected source-destination field pair; and
- for each source bit of the source field value:
  - select, from the destination field value, a destination bit located at a same bit position as the source bit;
  - apply an OR logic function to the source bit and the destination bit to generate a first resulting value;
  - store the first resulting value at the same bit position as the source bit in the first section;
  - apply an AND logic function to the source bit and the destination bit to generate a second resulting value; and
  - store the second resulting value at the same bit position as the source bit in the second section.

* * * * *